United States Patent [19]
Robinson et al.

[11] Patent Number: 5,294,994
[45] Date of Patent: Mar. 15, 1994

[54] INTEGRATED COMPUTER ASSEMBLY

[75] Inventors: Dennis C. Robinson, Marlboro; Jeffrey P. Copeland, Holden; Ricardo L. Fernandez, Beverly; Steve D. Venditti, Newton; Daniel J. J. Velasco, Hudson, all of Mass.

[73] Assignee: Digital Equipment Corporation, Maynard, Mass.

[21] Appl. No.: 863,612

[22] Filed: Apr. 6, 1992

[51] Int. Cl.⁵ .................. H04N 5/30; H05K 5/00; H05K 9/00; H01J 1/52
[52] U.S. Cl. .................... 348/825; 315/85; 174/35 MS; 348/836; 361/682; 361/683
[58] Field of Search ............... 358/229, 242, 245, 246, 358/247, 254, 255; 361/331, 380, 390, 400, 424; 174/35 MS; 364/708; 315/85; 313/313

[56] References Cited

U.S. PATENT DOCUMENTS

| | | | |
|---|---|---|---|
| 4,517,494 | 5/1985 | Yasui et al. | 358/245 |
| 4,785,136 | 11/1988 | Mollet et al. | 174/35 MS |
| 4,878,046 | 10/1989 | Smith | 340/705 |
| 5,021,763 | 6/1991 | Obear | 358/229 |
| 5,063,273 | 11/1991 | Bloks | 174/35 MS |
| 5,097,388 | 3/1992 | Buist et al. | 364/708 |
| 5,180,947 | 1/1993 | McGill | 315/85 |
| 5,192,893 | 3/1993 | Velasco et al. | 361/424 |

Primary Examiner—Edward L. Coles, Jr.
Assistant Examiner—Kimberly Williams
Attorney, Agent, or Firm—Albert P. Cefalo; Ronald C. Hudgens; James F. Thompson

[57] ABSTRACT

An computer assembly having an integral video display and processor subsystem in a single enclosure is described. The assembly contains an electrically conductive safety wall inside the enclosure which separates the interior of the enclosure into a high-voltage region where the video display components are mounted, and a low-voltage region where the processor subsystem is mounted. The enclosure has a removable rear cover which allows access to the processor subsystem for upgrading memory. An electrically conductive liner is attached to the rear cover for EMI shielding of the low-voltage region.

12 Claims, 4 Drawing Sheets

INTEGRATED COMPUTER ASSEMBLY

FIELD OF THE INVENTION

The invention relates to the field of computer enclosures incorporating EMI shielding and safety features.

BACKGROUND OF THE INVENTION

In the mechanical design of computer systems, it has been the practice to partition the system into at least two separate components, namely a video display monitor and a system box, connected by a cable. The monitor is commonly an assembly having a cathode-ray tube (CRT) or other video display, a power supply, high-voltage electronics to drive the display, and a small amount of relatively low-voltage electronics. The CRT and the high-voltage electronics are commonly referred to collectively as the video display components; they work together to display image data which is received by the low-voltage electronics from the system box via the cable.

The system box in a computer system might contain, for example, a microprocessor, memory, a disk drive, a power supply, and other circuitry. The collection of these components in the system box is commonly referred to as the processor subsystem. The processor subsystem runs software programs, accesses files stored on the disk drive, and responds to user input from a keyboard or mouse attached to the system box. The processor subsystem in the system box communicates with the monitor over a cable in order to display the results of its operations.

In the past, partitioning the system in two boxes as described above was advantageous for several reasons. The video display components in the monitor operate at dangerously high voltages, while the processor subsystem operates at lower voltages which are relatively safe. Since the processor subsystem is often customer-accessible for memory or disk upgrades, it should therefore be isolated from the high-voltage video display components for reasons of customer safety. Also, the electromagnetic interference (EMI) generated by the video display components could interfere with the operation of the processor subsystem, or vice-versa, so it has been beneficial to house them in separate EMI-shielded enclosures.

While the two-box approach to computer system design thus has technical advantages, it nevertheless imposes costs as well. There is the obvious cost of two enclosures, as well as two power supplies, power switches and power cords. There are also cables and connectors on each box merely to enable them to communicate with each other. All of these components add to the cost of the computer system. Additionally, the computer system must be packaged into two shipping containers, and thus is more expensive to ship.

The costs associated with a two-box system partition can be particularly burdensome in a small computer system which is meant to be sold in a price-sensitive market. Therefore it is desirable to reduce or eliminate excess costs while retaining the beneficial EMI and safety features of a two-box system.

SUMMARY OF THE INVENTION

The current invention is embodied in an integrated computer assembly which houses the video display components, power supply, and the processor subsystem within a single low-cost enclosure. Within the enclosure is an electrically conductive safety wall connected to chassis ground, which separates the enclosure into a video region and a processor region. Within the video region are the video display (which may be a CRT), the power supply, and the high-voltage electronics; the processor subsystem resides in the processor region. The processor subsystem is customer accessible through a cover or door having an electrically conductive liner to control EMI emissions. The processor subsystem and high-voltage electronics are safely connected directly together, so that there is no need for interposed communications logic.

The safety wall thus safely separates the high-voltage video components from the customer-accessible, low-voltage processor components. The safety wall also functions as an EMI barrier between the video and processor regions, so that mutual interference is minimized.

DESCRIPTION OF THE PREFERRED EMBODIMENT

Figure 1:
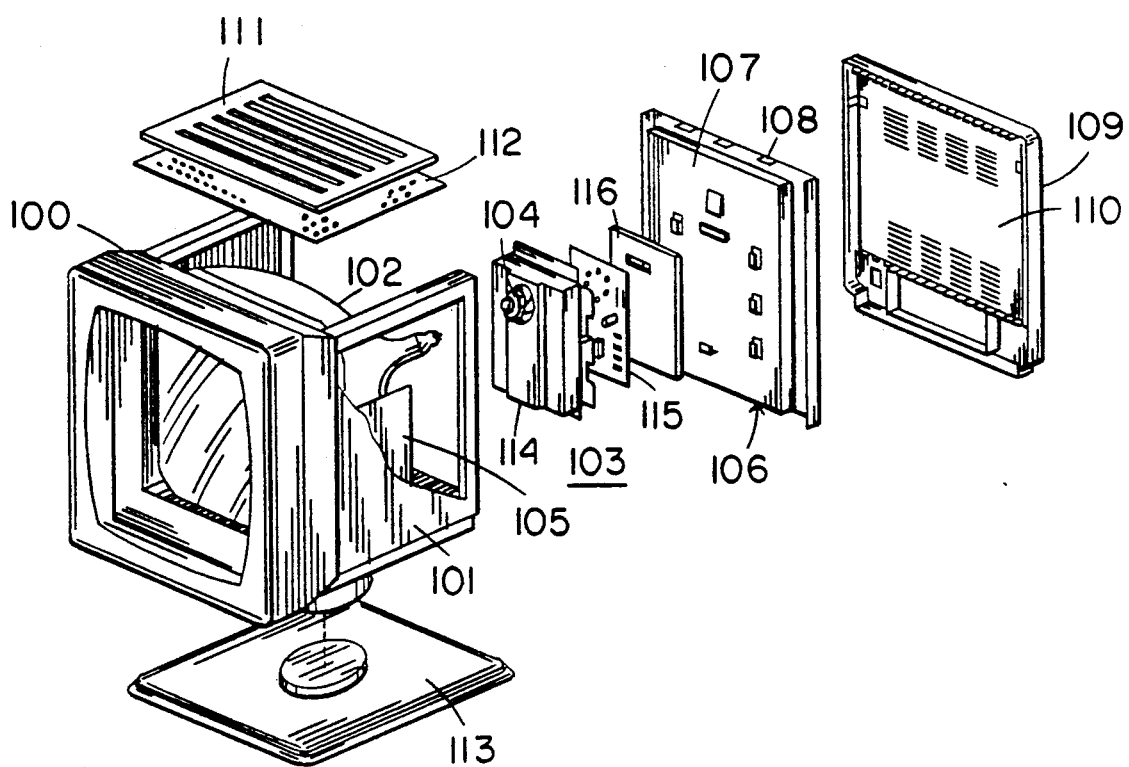
FIG. 1 is an exploded view of a computer assembly according to the principles of the invention.

FIG. 1 shows an exploded view of a single-enclosure computer assembly which embodies the invention. The system consists of a molded enclosure 100 having side walls 101 and housing a video display 102, which in the embodiment of FIG. 1 is a conventional CRT; a video amplifier assembly 103 having a plug 104 for connection to the video display 102; a power supply 105; and an electrically conductive safety wall 106 having a face 107 and tabs 108 along its top edge. The assembly has a rear cover 109 having an attached electrically conductive liner 110, and also a removable top cover 111 having an attached electrically conductive liner 112. The assembly shown in FIG. 1 may be mounted on a pedestal or base 113, and deployed on a desk or other work surface.

The power supply 105 in FIG. 1 provides in a conventional manner high-voltage power to the video display 102 and the video amplifier assembly 103. The video amplifier assembly 103 consists of a video amplifier cover 114, a conventional video amplifier circuit board 115, and a video amplifier rear cover 116.

The enclosure 100 of FIG. 1 is shown having a top opening to receive the top cover 111, and a rear opening to receive the rear cover 109. The bottom wall of the enclosure 100 (not visible in FIG. 1) is perforated in a conventional manner for ventilation, and is lined with an electrically conductive screen to achieve EMI shielding. Also, the interior surfaces of the side walls 101 of the enclosure 100 are painted with an electrically conductive paint, such as copper acrylic paint, which also achieves EMI shielding.

In FIG. 1, the video amplifier assembly 103 is mounted on the safety wall face 107. In an assembled unit, the plug 104 which protrudes from the video amplifier assembly 103 mates with the video display 102, as is further described in the U.S. Pat. No. 5,227,582 "Video Amplifier Assembly Mount", which is hereby incorporated by reference. The region between the safety wall face 107 and the front of the enclosure 100 is a high-voltage region in which the video display 102, the video amplifier assembly 103, and the power supply 105 are mounted. The top cover 111 covers the entire high-voltage region. The rear edge of the top cover 111 is held down by tabs 108 along the top of the safety wall 106 when it is secured to the enclosure 100.

Figure 2:
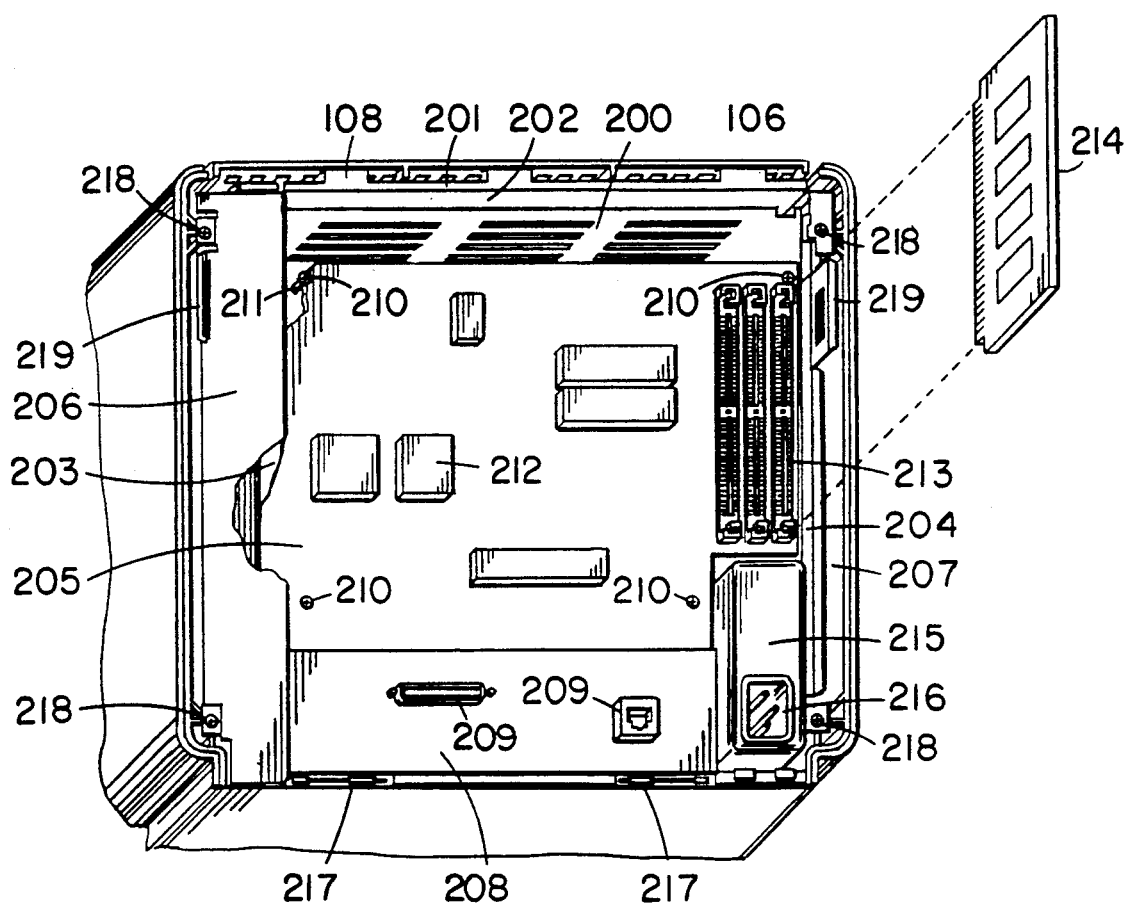
FIG. 2 is a rear view of the computer assembly of FIG. 1 without its rear cover installed.

FIG. 2 is a rear view of the computer assembly of FIG. 1. The safety wall 106 is a recessed wall member made of sheet metal. The safety wall 106 can be considered to have the shape of a five-sided box having a bottom 200, a top wall 201 having an inner surface 202, a bottom wall not visible in FIG. 2, and two side walls 203 and 204, all of which bound a recessed region in which is mounted a circuit board 205. The operating voltages in the recessed region are much lower than those in the high-voltage region, and therefore the recessed region is a relatively safe low-voltage region.

In FIG. 2, shoulder portions 206 and 207 extend from the tops of the two side walls 203 and 204 to the enclosure side walls 101, where they are secured to the enclosure 100 by captive screws 218. As shown in FIG. 2, shoulder portion 206 is wider than shoulder portion 207. The shoulder portions 206 and 207 provide laterally-extending surfaces that cooperate with mating surfaces on the liner 110 to effect EMI shielding when the rear cover 109 is in place. This cooperation is described in more detail below, with reference to FIG. 4. There are also metal snap receptacle tabs 219 on each side of the safety wall 106 to hold the rear cover 109 in place.

At the bottom of the safety wall 106 is a bulkhead 208 to which are attached various input/output (I/O) connectors 209. The bulkhead 208 covers the lower portion of the recessed region. The upper edge portion of the outwardly facing surface of the bulkhead 208 cooperates with features on the liner 110 to effect EMI shielding. The inner surface 202 of the top wall 201 also cooperates with the liner 110 to effect EMI shielding.

As shown in FIG. 2, the top wall 201 is perforated for ventilation. Although not shown in FIG. 2, the bottom wall has similar perforations for the same reason. In this manner, air is allowed to flow vertically through the recessed region to provide cooling for circuit components on the circuit board 205. The perforations are designed in a conventional manner to provide adequate airflow while effecting EMI shielding.

In alternative embodiments, it may be convenient for the safety wall 106 to be generally planar rather than box-shaped as shown in FIG. 2, and to have an upper edge extension or ledge. In such a configuration, the side edges, bottom edge, and upper extension cooperate with the liner 110 in the same fashion as do the shoulder portions 206 and 207, the bulkhead 208, and the inner surface 202 of the top wall 201 to effect EMI shielding.

The circuit board 205 in FIG. 2 is mounted within the recessed region of the safety wall 106 by screws 210 which engage standoffs 211 on the safety wall face 107. The circuit board 205 contains components that implement the processor subsystem of the computer assembly of FIG. 1. On the circuit board 205, there are several integrated circuits 212, some of which constitute processor memory. In addition, expansion slots 213 are capable of accepting additional processor memory in the form of single-in-line memory modules, or SIMs 214. The I/O connectors 209 connect the circuit board 205 to external devices, such as a keyboard and a communications bus. Also shown in FIG. 2 is an AC line filter 215 having a socket 216 to accept an AC power cord.

There are particular advantages which arise from the circuit board 205 mounting described above. While the circuit board 205 is customer-accessible for upgrades, it is not easily customer-removable. Since the circuit board 205 remains in the assembly during an upgrade, the integrated circuits 212 are not exposed to high levels of potentially damaging static electricity.

Also shown in FIG. 2 are hinge portions 217 at the bottom of the safety wall 106 to mate with corresponding hinge portions on the rear cover 109 of FIG. 1. In this manner, the rear cover 109 acts as an access door to the low-voltage recessed region. In alternative embodiments it may be advantageous to have a removable cover rather than a door, or to place the cover or door in another location, for example on one side.

When the unit is fully assembled, only the low-voltage recessed region may be accessed through the rear cover 109; the safety wall 106 prevents access into the high-voltage region. The high-voltage region may be accessed by removing the safety wall 106, which also releases the top cover 111 for removal. The safety wall 106 may only be removed by a special tool carried by a service technician, so that non-service personnel cannot easily gain access to the high-voltage region.

In addition to the safety-related partitioning that the safety wall 106 accomplishes, it also acts in conjunction with other features of the enclosure 100 and rear cover 109 of FIG. 1 to reduce the transfer of EMI emissions from both the high-voltage and low-voltage regions of the enclosure 100. Both regions are surrounded by electrically conductive materials which tend to trap EMI radiation.

In operation, the processor circuit board 205 of FIG. 2 produces low-voltage video signals which represent an image to be displayed on the video display 102. These low-voltage video signals are amplified in the video amplifier assembly 103 and the resulting high-voltage video signals are applied to the video display 102. The electronic components on the processor circuit board 205 operate at generally safe voltage levels, such as +5 volts DC. The processor circuit board 205 may be the central processing unit (CPU) in a computer system, and therefore be capable of generating images itself from a locally-executing software program. This would be the case, for example, in a personal computer or PC. Alternatively, the processor circuit board 205 may merely be operating on and displaying image data that it receives over a communications port from a remote computer (not shown in FIG. 2). This would be the case in a video terminal for use with a remote host computer. In the embodiment of FIGS. 1 and 2, the processor circuit board 205 is designed to implement a DECwindows TM video terminal.

While the embodiment of FIG. 2 has a single processor circuit board 205 holding the low-voltage components, there may be other arrangements of the components within the low-voltage region. It is obviously preferred that the low-voltage components fit entirely within the low-voltage region, in order to realize the cost effectiveness of the one-box approach.

While the arrangement shown in FIGS. 1 and 2 is particularly advantageous when the processor circuit board 205 is designed to be upgraded by non-service personnel, as described above, the principles of the invention are not so limited. The EMI and safety advantages of the arrangement shown in FIGS. 1 and 2 are equally present in embodiments lacking the ability to be upgraded.

Figure 3:
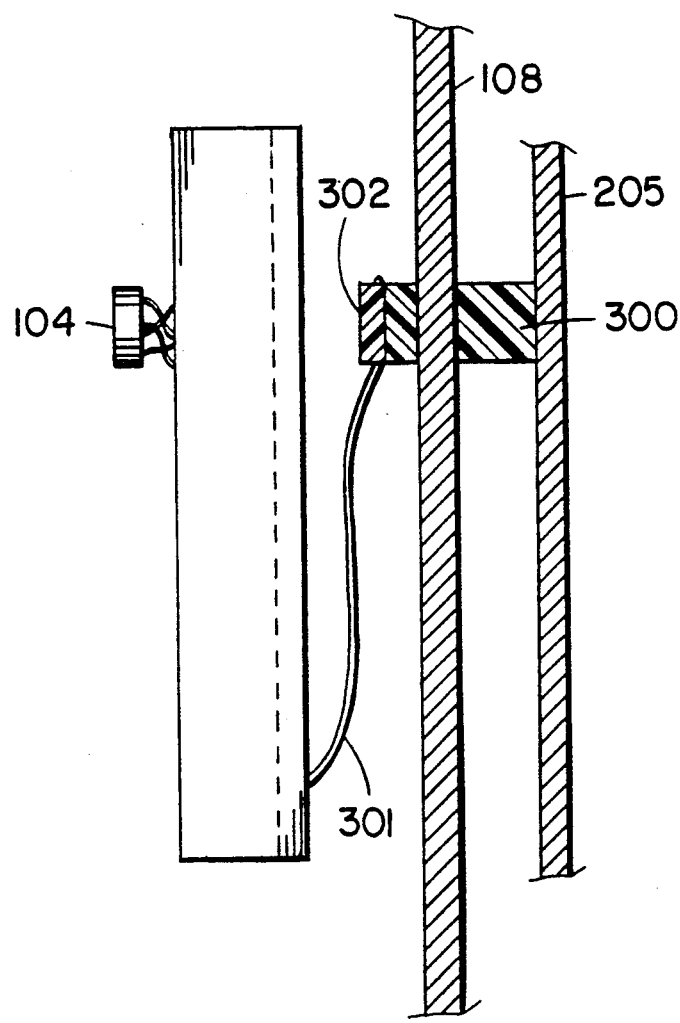
FIG. 3 shows the interconnection between the video amplifier assembly and the circuit board of FIG. 1.

FIG. 3 shows the interconnection between the video amplifier assembly 103 of FIG. 1 and the circuit board 205 of FIG. 2, which is the means by which the low-voltage video signals produced by the circuit board 205 are transferred from the low-voltage region to the high-voltage region. There is a connector 300 attached to the rear of the circuit board 205 which protrudes through a hole in the safety wall 106 into the high-voltage region. A cable 301, which is attached to the video amplifier assembly, terminates in a connector 302 which removably mates with connector 300. The dashed line in FIG. 3 indicate a shallow recessed portion within the video amplifier assembly 103 to accommodate the cable when the video amplifier assembly 103 is attached to the safety wall 106.

Figure 4:
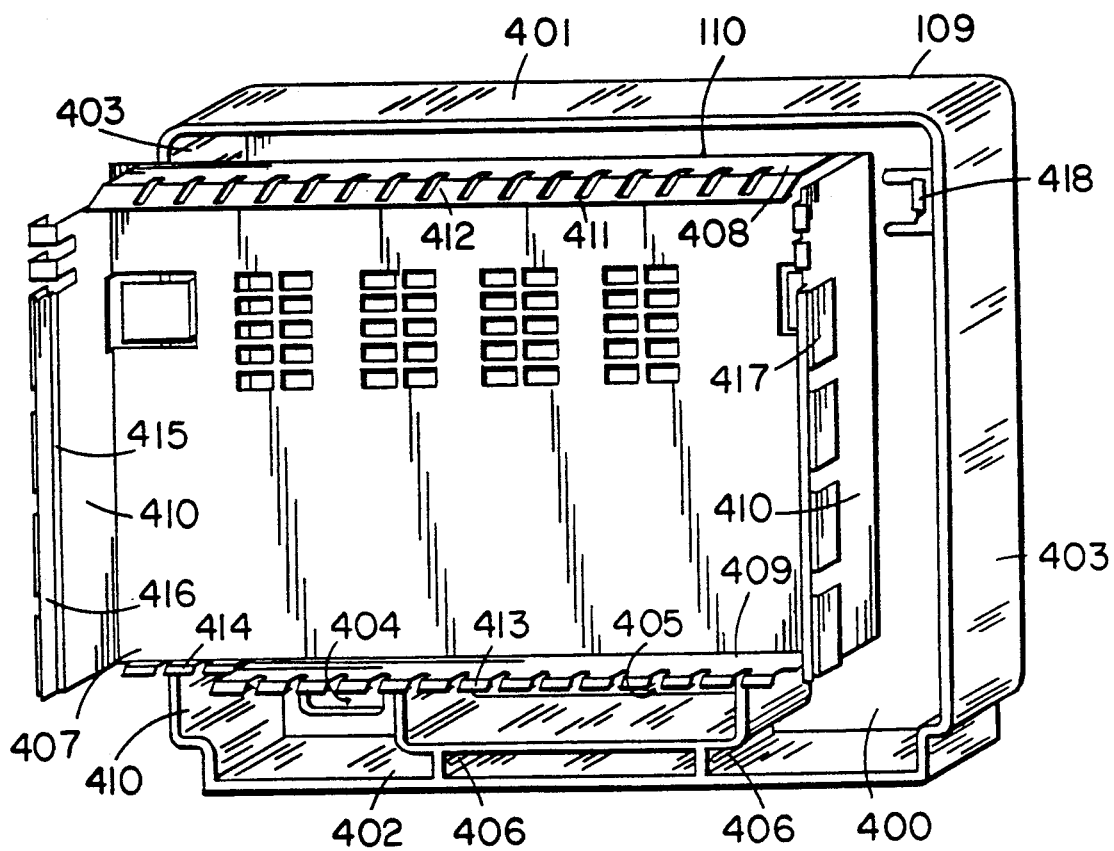
FIG. 4 is an exploded view of the rear cover of FIG. 1.

FIG. 4 illustrates the rear cover 109 and its liner 110. The rear cover 109 has a bottom 400, top wall 401, bottom wall 402, side walls 403, and apertures 404 and 405. The bottom 400 has ventilation holes which are not shown in FIG. 4. The aperture 404 allows access to the AC line filter socket 216; the aperture 405, to the I/O connectors 209. Hinge portions 406 mate with the hinge portions 217 on the safety wall 106 to allow the rear cover 109 to rotate downward when opened. The top portion of the rear cover 109 is secured to the assembly by snap features 418 which form latches with the snap receptacle tabs 219 on the safety wall. The snap features 418 are deformable cantilevered beams surrounded by a U-shaped cut. The rear cover can be removed by pushing the snap features 418, thus disengaging their jaws from the openings in the snap receptacle tabs 219, and pulling the rear cover 109 downward. The U-shaped cut enables the snap features 418 to be formed during manufacturing of the rear cover 109 without side-action units, or slides, in its injection mold.

The liner 110 is made of a springy electrically conductive material, such as stainless steel. It has a bottom 407, top wall 408, a bottom wall 409, and two side walls 410. The liner 110 has ventilation holes at locations corresponding to the ventilation holes in the rear cover 109.

Along the top wall 408 of the liner 100 is a longitudinal strip 411 which is joined to the top wall 408 by a plurality of spaced-apart segments 412 which are bent slightly. The strip 411 is hemmed as shown so that someone handling the liner 110 is not exposed to sharp edges. When the rear cover 109 is in place, the plurality of segments 412 sealingly engage the inner surface 202 of the top wall 201 of the safety wall 106 to effect EMI shielding.

Along the bottom wall 409 are a plurality of fingers 413 whose tips are bent slightly. The fingers 413 are also hemmed for safety reasons. When the rear cover is in place, the fingers 413 engage the outwardly facing surface of the bulkhead 208 of FIG. 2 near its upper edge. Additionally, there are tabs 414 extending from the face of the liner 110 that engage the surface of the AC line filter 215.

On each of the liner side walls 410, there is a ledge 415, extension 416, and a plurality of bent-back fingers 417. When the rear cover 109 is in place, the ledges 415 sealingly engage the shoulder portions 206 and 207 of the side walls 203 and 204 of the safety wall 106, thus effecting EMI shielding of the low-voltage region. Also, the extensions 416 and bent-back fingers 417 extend into the gaps between the sides of the safety wall 106 and the enclosure side walls 101. The bent-back fingers 417 make contact with the conductively-painted inner surfaces of the enclosure side walls 101, thus sealing the gaps to prevent EMI leakage from the high-voltage region of the enclosure 100.

The sizes of the ventilation holes and finger spacing on the liner 110 are chosen in a known fashion to accomplish ventilation while reducing EMI emissions to an acceptable level. The dimensioning of the opening is related to the wavelength of the highest operating frequency within the low-voltage region. In the embodiment of FIGS. 1 through 4, the highest operating frequency is approximately 100 Mhz. In embodiments with substantially different operating frequencies, the sizes of the openings will vary from that shown in FIG. 4. In particular, an embodiment having a higher operating frequency will require smaller openings to effectively reduce EMI emissions.

What is claimed is:

1. An integrated computer assembly, comprising:
   an enclosure;
   a safety wall within said enclosure separating the interior of said enclosure into a high-voltage region and a low-voltage region;
   a video display within said high-voltage region;
   means fixed within said low-voltage region for producing low-voltage video signals;
   means for transferring said low-voltage video signals from said low-voltage region into said high-voltage region; and
   means within said high-voltage region for producing high-voltage video signals from said low-voltage video signals and for supplying said high-voltage video signals to said video display.

2. An integrated computer assembly according to claim 1, wherein said means for producing low-voltage video signals is secured to said safety wall.

3. An integrated computer assembly according to claim 1, wherein said means for producing low-voltage video signals comprises a circuit board mounted vertically within said low-voltage region.

4. An integrated computer assembly according to claim 1, wherein said video display is a cathode-ray tube.

5. An integrated computer assembly according to claim 1, wherein said means for producing low-voltage video signals includes memory, and further comprising:
   means for connecting additional memory to said means for producing low-voltage video signals; and
   a removable cover to allow access to said low-voltage region for connecting said additional memory.

6. An integrated computer assembly according to claim 1, wherein said means for producing said high-voltage video signals comprises a shielded video amplifier assembly mounted on said safety wall.

7. An integrated computer assembly according to claim 1, wherein said transferring means comprises:
   a first connector extending through a hole in said safety wall to couple said low-voltage video signals to said high-voltage region; and
   a flexible cable in said high-voltage region, said flexible cable terminating at a second connector connected to said first connector to couple said low-voltage video signals to said means for producing said high-voltage video signals.

8. A housing for an integrated computer assembly, comprising:
- an enclosure having a bottom wall and two vertical enclosure side walls each having an electrically conductive inner surface, said enclosure having a rear opening;
- an open-box-shaped electrically conductive safety wall extending between said enclosure side walls dividing the interior of said enclosure into two regions, said safety wall having a bottom, a top wall, and two side walls, said top and side walls extending normally from said bottom, said side walls corresponding to and substantially parallel to said two enclosure side walls, wherein each of said two side walls has a shoulder portion extending laterally outward having an outer edge generally conforming to and closely spaced from the corresponding one of said two enclosure side walls, said safety wall having a bulkhead adjacent to said bottom wall of said safety wall and substantially parallel to said bottom of said safety wall;
- a removable open-box-shaped rear cover to cover said rear opening of said enclosure;
- an open-box-shaped liner mounted in said rear cover and made of a springy electrically conductive material, said liner having a bottom, a top wall, a bottom wall, and two side walls extending normally from said bottom, wherein said bottom, said top wall and said side walls are dimensioned so that said top wall and said side walls of said liner adjoin said top wall and said side walls of said cover, and wherein said top wall has a bent portion having a hemmed longitudinal strip joined to said top wall by a plurality of spaced-apart segments such that when said cover is in place said segments contact the inner surface of said top wall of said safety wall, and wherein said bottom wall has a plurality of spaced-apart tabs having bent tips such that when said cover is in place said tips contact the outer surface of said bulkhead, and wherein each of said side walls has a ledge portion extending laterally outward and a plurality of bent-back tabs such that when said cover is in place said ledge portion contacts said shoulder portion of the corresponding one of said two side walls of said safety wall and said bent-back tabs contact said electrically conductive inner surface of the corresponding one of said two enclosure side walls.

9. A housing for an integrated computer assembly according to claim 8, wherein said springy electrically conductive material is stainless steel.

10. A housing for an integrated computer assembly according to claim 8, wherein said conductive surface of each of said two enclosure side walls comprises electrically conductive paint.

11. An integrated computer assembly, comprising:
- an enclosure;
- an electrically conductive safety wall within said enclosure separating the interior thereof into a high-voltage region and a low-voltage region;
- a cathode-ray tube (CRT) within said high-voltage region;
- a circuit board mounted on said safety wall in said low-voltage region having circuitry thereon for generating low-voltage video signals;
- a first connector connected to said circuit board and extending through a hole in said safety wall to couple said low-voltage video signals to said high-voltage region; and
- a shielded video amplifier assembly mounted on said safety wall in said high-voltage video region opposite said circuit board, said video amplifier assembly having a video amplifier with a flexible cable connected thereto terminating at a second connector connected to said first connector to receive said low-voltage video signals and to generate high-voltage video signals therefrom, said video amplifier being connected to said CRT to supply said high-voltage video signals thereto.

12. An integrated computer assembly according to claim 11, wherein said hole in safety wall is located directly behind said video amplifier assembly, and where said video amplifier assembly has a rear recess to accommodate said flexible cable, said second connector, and the portion of said first connector extending through said hole into said high-voltage region.

* * * * *